(12) United States Patent
Sumikawa et al.

(10) Patent No.: US 11,313,691 B2
(45) Date of Patent: Apr. 26, 2022

(54) INFORMATION PROCESSING APPARATUS FOR VEHICLE, INFORMATION PROCESSING SYSTEM FOR VEHICLE, AND CONTROL APPARATUS FOR VEHICLE

(71) Applicant: SUBARU CORPORATION, Tokyo (JP)

(72) Inventors: Ryuichi Sumikawa, Tokyo (JP); Takeshi Torii, Tokyo (JP); Noeru Sato, Tokyo (JP); Akiko Sugiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 200 days.

(21) Appl. No.: 16/736,877

(22) Filed: Jan. 8, 2020

(65) Prior Publication Data

US 2020/0284603 A1    Sep. 10, 2020

(30) Foreign Application Priority Data

Mar. 8, 2019    (JP) .............................. JP2019-043125

(51) Int. Cl.
*B60W 40/09*    (2012.01)
*G01C 21/34*    (2006.01)
*G09B 19/16*    (2006.01)
*G01C 21/36*    (2006.01)

(52) U.S. Cl.
CPC ..... *G01C 21/3484* (2013.01); *G01C 21/3676* (2013.01); *G09B 19/167* (2013.01)

(58) Field of Classification Search
CPC ............ G01C 21/3484; G01C 21/3676; G09B 19/167
See application file for complete search history.

(56) References Cited

U.S. PATENT DOCUMENTS

| | | | |
|---|---|---|---|
| 2002/0023062 A1* | 2/2002 | Kamihira ............. | G05B 13/028 706/11 |
| 2012/0191343 A1* | 7/2012 | Haleem .............. | G01C 21/3461 701/431 |
| 2019/0077413 A1* | 3/2019 | Kondo .............. | B60W 50/0098 |

FOREIGN PATENT DOCUMENTS

JP    2003-99897 A    4/2003

* cited by examiner

*Primary Examiner* — Mathew Franklin Gordon
(74) *Attorney, Agent, or Firm* — Troutman Pepper Hamilton Sanders LLP

(57) ABSTRACT

An information processing apparatus, for a vehicle, includes a skill level acquiring unit, a vehicle position information acquiring unit, and a map acquiring generating unit. The skill level acquiring unit is configured to acquire driving skill levels of respective drivers of a plurality of vehicles. The vehicle position information acquiring unit is configured to acquire pieces of position information of the vehicles. The map acquiring generating unit is configured to acquire map information on the basis of the driving skill levels acquired by the skill level acquiring unit and the pieces of position information acquired by the vehicle position information acquiring unit. The map information indicates presence of the vehicles on a road map in accordance with the respective driving skill levels of the drivers of the vehicles.

19 Claims, 7 Drawing Sheets

INFORMATION PROCESSING APPARATUS FOR VEHICLE, INFORMATION PROCESSING SYSTEM FOR VEHICLE, AND CONTROL APPARATUS FOR VEHICLE

CROSS-REFERENCE TO RELATED APPLICATIONS

The present application claims priority from Japanese Patent Application No. 2019-043125 filed on Mar. 8, 2019, the entire contents of which are hereby incorporated by reference.

BACKGROUND

The technology relates to an information processing apparatus for a vehicle, an information processing system for a vehicle, and a control apparatus for a vehicle.

A technique of assisting a driver of a vehicle in accordance with a skill level of the driver has been existing, for example, as disclosed in Japanese Unexamined Patent Application Publication No. 2003-099897.

SUMMARY

An aspect of the technology provides an information processing apparatus for a vehicle. The information processing apparatus includes a skill level acquiring unit, a vehicle position information acquiring unit, and a map information acquiring unit. The skill level acquiring unit is configured to acquire driving skill levels of respective drivers of a plurality of vehicles. The vehicle position information acquiring unit is configured to acquire pieces of position information of the vehicles. The map information acquiring unit is configured to acquire map information on the basis of the driving skill levels acquired by the skill level acquiring unit and the pieces of position information acquired by the vehicle position information acquiring unit. The map information indicates presence of the vehicles on a road map in accordance with the respective driving skill levels of the drivers of the vehicles.

An aspect of the technology provides an information processing system for a vehicle. The system includes a control apparatus and an information processing apparatus. The control apparatus includes a skill level determining unit and a transmission process unit. The skill level determining unit is configured to determine a driving skill level of a driver of a vehicle. The transmission process unit is configured to perform a process of transmitting the driving skill level and position information of the vehicle. The information processing apparatus includes a skill level acquiring unit, a vehicle position information acquiring unit, and a map information generating unit. The skill level acquiring unit is configured to acquire the driving skill levels of the drivers of a plurality of the vehicles. The vehicle position information acquiring unit is configured to acquire pieces of the position information of the vehicles. The map information generating unit is configured to generate map information in accordance with the driving skill levels acquired by the skill level acquiring unit and the pieces of position information acquired by the vehicle position information acquiring unit. The map information indicates presence of the vehicles on a road map on the basis of the respective driving skill levels of the drivers of the vehicles.

An aspect of the technology provides a control apparatus for a vehicle. The control apparatus includes a skill level acquiring unit, a transmission process unit, and a reception process unit. The skill level acquiring unit is configured to acquire a driving skill level of a driver of a vehicle. The transmission process unit is configured to perform a process of transmitting the driving skill level acquired by the skill level acquiring unit and position information of the vehicle. The reception process unit is configured to receive map information. The map information is generated on the basis of the driving skill levels of a plurality of vehicles and pieces of the position information of the vehicles. The map information indicates presence of the vehicles on a road map in accordance with the respective driving skill levels of the drivers of the vehicles.

An aspect of the technology provides an information processing apparatus, for a vehicle, that includes circuitry. The circuitry is configured to acquire driving skill levels of respective drivers of a plurality of vehicles. The circuitry is configured to acquire pieces of position information of the vehicles. The circuitry is configured to generate map information on the basis of the acquired driving skill levels and the acquired pieces of position information. The map information indicates presence of the vehicles on a road map in accordance with the respective driving skill levels of the drivers of the vehicles.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
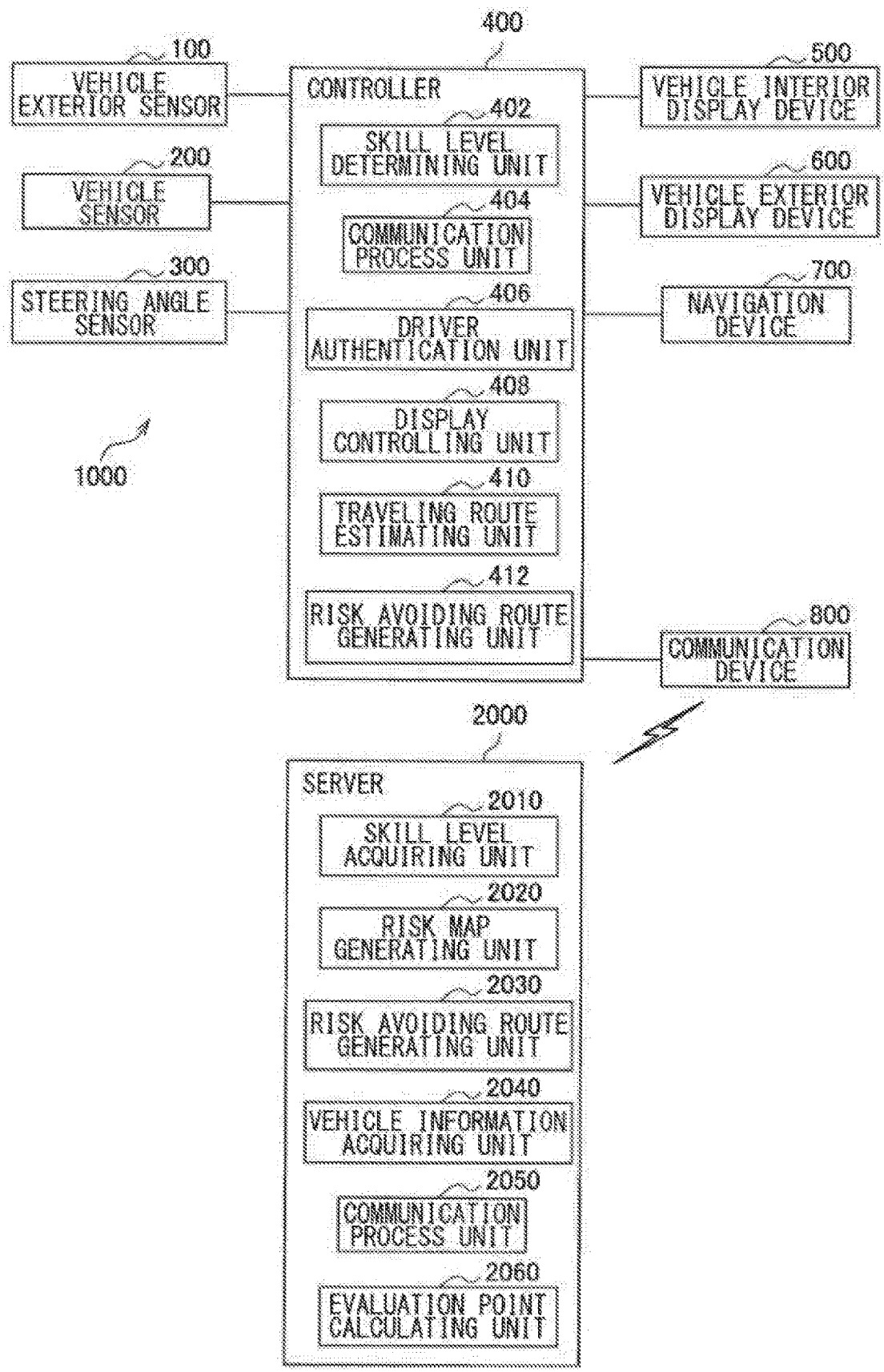
FIG. 1 is a schematic diagram illustrating an example of a vehicle system according to one example embodiment of the technology and an example of a configuration around the vehicle system.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

FIG. 1 is a schematic diagram illustrating a configuration of a vehicle system 1000 according to an example embodiment of the technology and a configuration around the vehicle system 1000. The vehicle system 1000 may be basically mounted on a vehicle such as an automobile. The vehicle system 1000 may include a vehicle exterior sensor 100, a vehicle sensor 200, a steering angle sensor 300, a controller 400, a vehicle interior display device 500, a vehicle exterior display device 600, a navigation device 700, and a communication device 800, as illustrated in FIG. 1. The vehicle system 1000 may be configured to perform communication between the vehicle system 1000 and another communication apparatus outside the vehicle. In one example embodiment, the other communication apparatus outside the vehicle may be a server 2000, for example.

The vehicle exterior sensor 100 may include a device such as a stereo camera, a monocular camera, a millimeter-wave radar device, or an infrared sensor. The vehicle exterior sensor 100 may measure a position and a speed of an object around the own vehicle such as a person or another vehicle. In a case where the vehicle exterior sensor 100 includes the stereo camera, the stereo camera may include a pair of a right camera and a left camera. The right camera and the left camera may each include an imaging device such as a charge-coupled device (CCD) sensor or a complementary metal oxide semiconductor (CMOS) sensor. The stereo camera may pick up an image of an external environment outside the vehicle and supply information of the picked-up image to the controller 400. In one non-limiting example, the stereo camera may include color cameras that are configured to acquire color information, and may be disposed at an upper portion of a windshield of the vehicle.

The vehicle sensor 200 may acquire information communicated by means of an in-vehicle controller area network (CAN) such as information related to a speed, an acceleration, an angular velocity, or a yaw rate of the vehicle. The above-described information may be acquired from various sensors.

The steering angle sensor 300 may be attached to a steering wheel and detect a steering angle of the steering wheel.

The controller 400 may determine a driving skill level of a driver who drives a vehicle and supply the determined driving skill level to the server 2000. According to one example embodiment, the controller 400 may include a skill level determining unit (a skill level acquiring unit) 402, a communication process unit 404, a driver authentication unit 406, a display controlling unit 408, a traveling route estimating unit 410, and a risk avoiding route generating unit 412. The skill level determining unit 402 determines the driving skill level of the driver. The communication process unit 404 may perform a process of transmitting the driving skill level of the driver determined by the skill level determining unit 402 to the server 2000 via the communication device 800. The communication process unit 404 may perform a process of transmitting, to the server 2000 via the communication device 800, information such as a current position of the vehicle or a traveling route of the vehicle in addition to the driving skill level of the driver. The communication process unit 404 may also perform a process of receiving, via the communication device 800, map information and information related to a risk avoiding route that are generated by the server 2000. The map information generated by the server 2000 may be hereinafter also referred to as a risk map. The driver authentication unit 406 may perform authentication of the driver who actually drives the vehicle. For example, the authentication of the driver may be performed by authenticating a name or an ID inputted by the driver, or by authenticating a part such as a driver's face or a driver's fingerprint. A method of authentication of the driver is, however, not limited to the above-described example methods and may be any of various methods. The traveling route estimating unit 410 may estimate a traveling route. The risk avoiding route generating unit 412 may generate a risk avoiding route on the basis of the risk map generated by the server 2000. As will be described later, it may be sufficient that the risk avoiding route generating unit 412 is provided on one of the vehicle system 1000 or the server 2000. For example, in a case where the risk avoiding route generating unit 412 is provided in the server 2000, the risk avoiding route generating unit 412 may not be provided in the vehicle system 1000, i.e., in the controller 400. FIG. 1 illustrates a configuration of the controller 400 as a functional module; however, the controller 400 may physically include circuitry, i.e., a hardware configuration provided with devices such as a central processing unit (CPU), various storage devices, or an input-output interface. Non-limiting examples of the storage devices may include a read-only memory (ROM) and a random-access memory (RAM). The controller 400 may also mounted with a program, i.e., software, directed to operating the above-described hardware configuration.

The vehicle interior display device 500 may include a display unit inside a vehicle compartment. The vehicle interior display device 500 may perform display at a location such as an interior dash panel or a region around a meter, for example.

The vehicle exterior display device 600 may include a display unit outside the vehicle compartment. Non-limiting examples of the vehicle exterior display device 600 may include a head-up display (HUD) device and a side mirror. The HUD device may display a virtual image of the display unit outside the vehicle compartment on a front windshield or a rear windshield of the vehicle, for example. To be more precise, the HUD device may display the virtual image of the display unit on the front windshield or the rear windshield as if the display device is present outside the vehicle compartment.

The communication device 800 may perform communication with outside of the vehicle, e.g., a vehicle information and communication system (VICS) to receive various pieces of information such as traffic congestion information or road information. The communication device 800 may transmit information such as the driving skill level of the driver, position information of the vehicle, or traveling route information to the server 2000. The communication device 800 may also receive information such as the risk map or information related to the risk avoiding route from the server 2000. In one example embodiment, the communication between the communication device 800 and the server 2000 may be performed wirelessly; however, the communication between the communication device 800 and the server 2000 is not limited to a particular method, and may be performed by vehicle-to-vehicle communication or road-to-vehicle communication, for example.

The navigation device 700 may acquire the map information by means of communication with the outside of the vehicle or may hold the map information in advance. The navigation device 700 may search for a route from a current position of the vehicle to a destination on the basis of the map information. The navigation device 700 may be configured to acquire the current position of the vehicle by a method such as a global positioning system (GPS) and may be configured to display the acquired current position on the display unit of the vehicle interior display device 500 together with the road map. The navigation device 700 may hold information related to a route to the current position that has been traveled by the vehicle for a predetermined distance. The distance of the route to be held by the navigation device 700 may be appropriately set by, for example, a manufacturer or a dealer of the vehicle in accordance with, for example, a factor such as a storage capacity of the navigation device 700.

The server 2000 acquires, from a plurality of vehicles, pieces of information related to the driving skill levels of the drivers each determined by the vehicle system 1000. The server 2000 generates the risk map, i.e., the map information, on the basis of the acquired driving skill levels and positions of the respective vehicles. The map information may indicate a distribution of the vehicles in accordance with the driving skill levels of the respective drivers of the vehicles. Further, the server 2000 may set a recommended route for the vehicle on the basis of the generated map information. The server 2000 may provide the set recommended route to the driver of the vehicle via the vehicle system 1000. This allows for setting of a route, for example, that avoids a region in which vehicles with drivers having low driving skill levels are densely present.

In one example embodiment, the server 2000 may include a skill level acquiring unit 2010, a risk map generating unit 2020, a risk avoiding route generating unit 2030, a vehicle information acquiring unit 2040, a communication process unit 2050, and an evaluation point calculating unit 2060. The skill level acquiring unit 2010 may acquire the driving skill level of the driver transmitted from the vehicle system 1000. The risk map generating unit 2020 may generate a risk map on the basis of the acquired driving skill levels and the acquired pieces of position information of the vehicles. The risk map may indicate a distribution of the vehicles in accordance with the driving skill levels of the respective drivers of the vehicles. The risk avoiding route generating unit 2030 may generate the risk avoiding route that avoids a risk in accordance with the driving skill level. The vehicle information acquiring unit 2040 may acquire information such as the position of the vehicle or the traveling route. The communication process unit 2050 may perform a process of receiving information, transmitted from the vehicle system 1000, including the driving skill levels of the drivers, pieces of position information of the vehicles, and pieces of traveling route information. The communication process unit 2050 may also perform a process of transmitting, to the vehicle system 1000, information including the risk map and the risk avoiding route. The evaluation point calculating unit 2060 may calculate, as a risk evaluation point, a ratio of the number of vehicles driven by non-skilled drivers to the total number of the vehicles present in a predetermined range of the road map. In one example embodiment, the risk map generating unit 2020 may acquire the risk map from another apparatus instead of generating the risk map.

FIG. 1 illustrates the configuration of the server 2000 as a functional module; however, the server 2000 may physically include circuitry, i.e., a hardware configuration provided with devices such as a central processing unit (CPU). The server 2000 may also mounted with a program, i.e., software, directed to operating the above-described hardware configuration.

Figure 2:
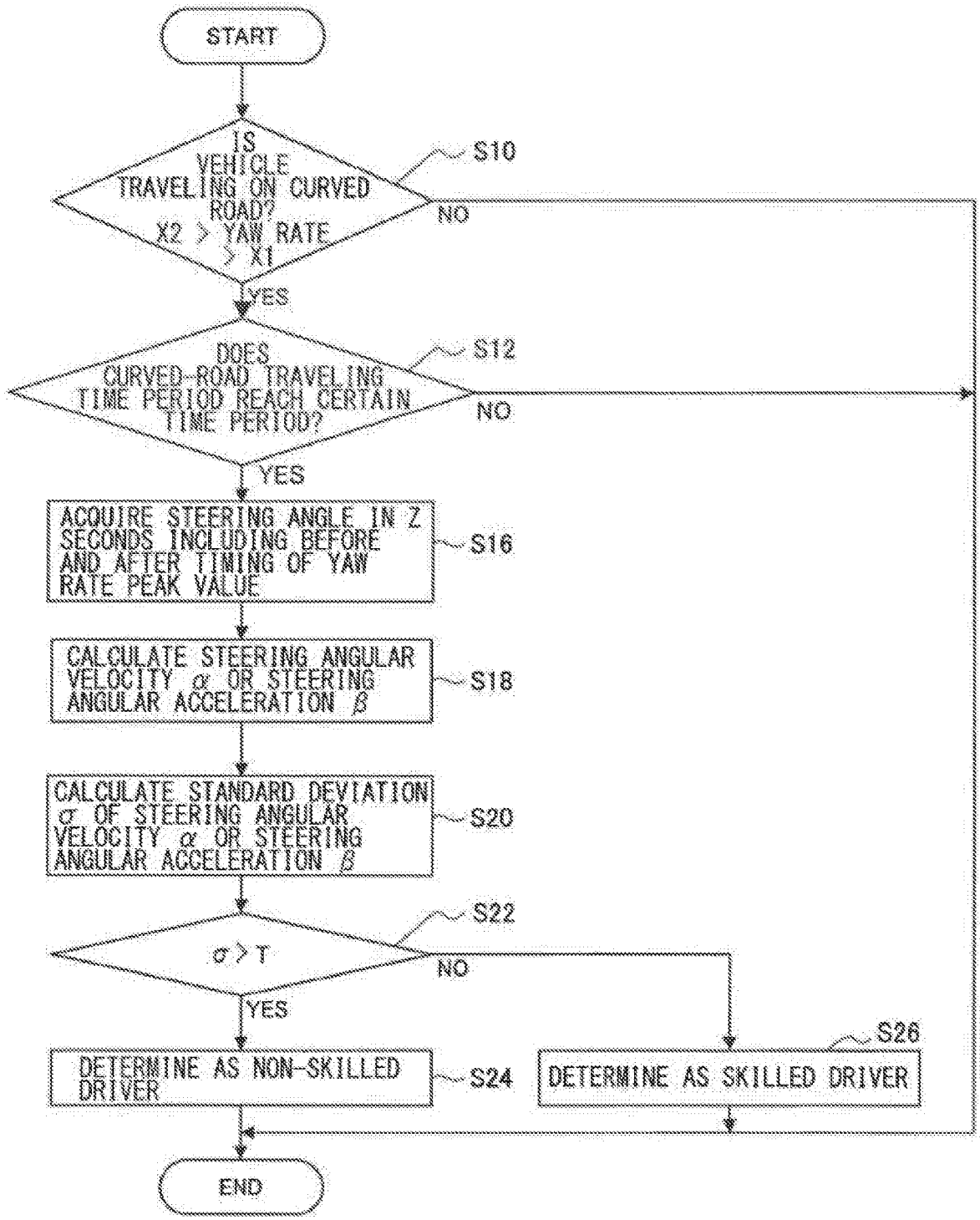
FIG. 2 is a flowchart illustrating an example of a process of determining whether a driver is a skilled driver according to the example embodiment.
Figure 3:
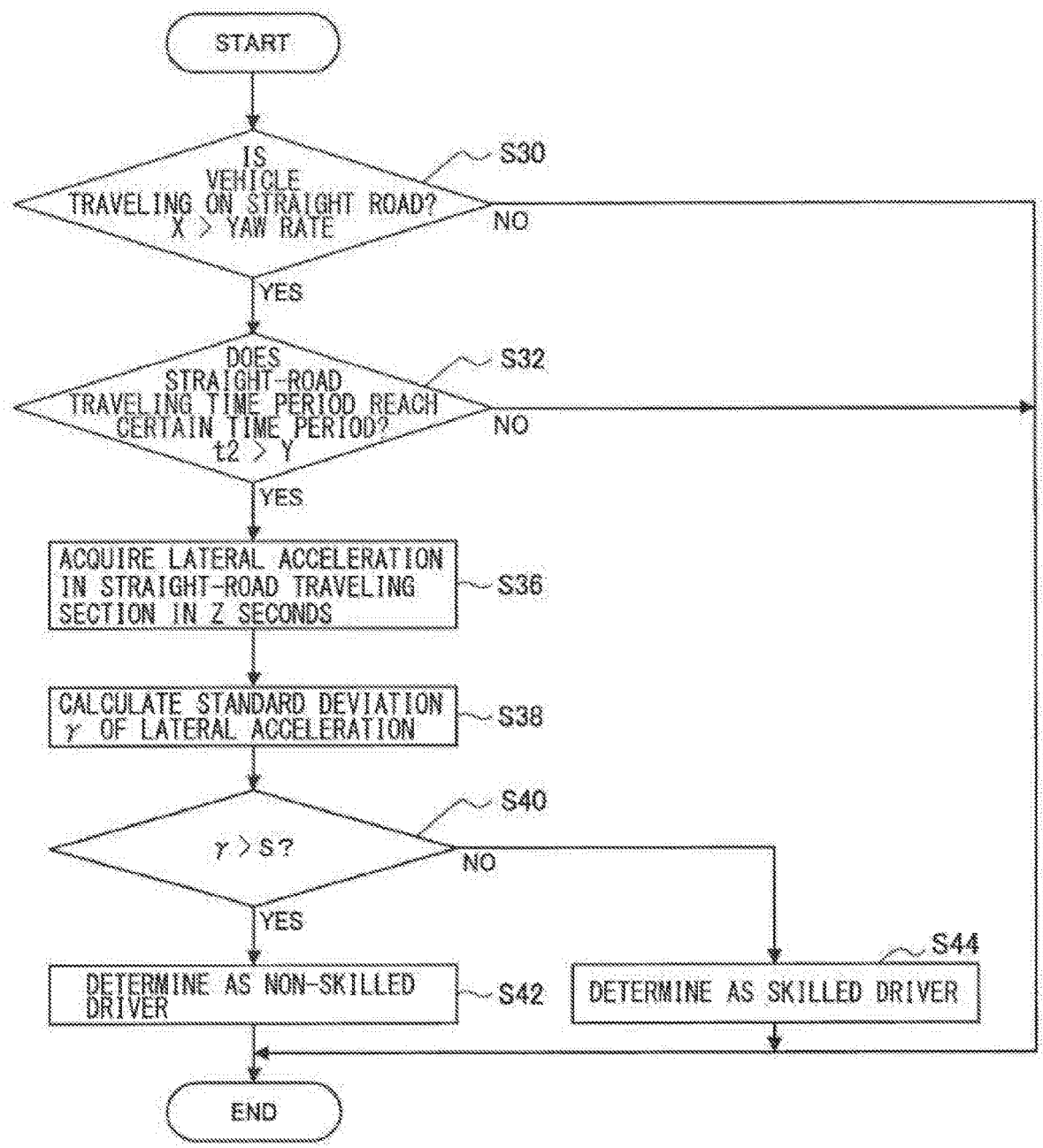
FIG. 3 is a flowchart illustrating another example of the process of determining whether the driver is the skilled driver according to the example embodiment.

FIGS. 2 and 3 are each a flowchart illustrating an example of a process of determining whether the driver is a skilled driver. The processes illustrated in FIGS. 2 and 3 may be performed by the controller 400 every predetermined cycle. In one specific but non-limiting example, the processes illustrated in FIGS. 2 and 3 may be performed mainly by the skill level determining unit 402. FIG. 2 illustrates a process of determining the driving skill level on the basis of a driving state at a time when the vehicle is traveling on a curved road. The curved road may be a road with a single curved portion with no need to perform switching of steering or a road with a plurality of curved portions which requires to perform switching of steering.

First, in step S10, the controller 400 may determine whether the vehicle is traveling on the curved road, on the basis of the yaw rate of the vehicle detected by the vehicle sensor 200. In a specific but non-limiting example, the controller 400 may determine that the own vehicle is traveling on the curved road when the yaw rate is greater than a first threshold X1 and smaller than a second threshold X2 in step S10. When the vehicle is determined as being traveling on the curved road (YES in step S10), the process may proceed to step S12. When the vehicle is determined as not being traveling on the curved road (NO in step S10), the controller 400 may bring the process to an end.

In step S12, the controller 400 may determine whether a curved-road traveling time period t1, i.e., a time period during which the vehicle is traveling on the curved road, reaches a certain time period. In a specific but non-limiting example, in step S12, the controller 400 may measure the curved-road traveling time period t1 and determine whether the curved-road traveling time period t1 is greater than a threshold Y. When the curved-road traveling time period t1 is greater than the threshold Y (YES in step S12), the controller 400 may determine that the curved-road traveling time period t1 reaches the certain time period, and the process may proceed to step S16. When the curved-road traveling time period t1 is equal to or smaller than the threshold Y (NO in step S12), the controller 400 may bring the process to an end.

In step S16, the controller 400 may acquire a steering angle in a time period of Z seconds that includes time periods before and after timing at which the yaw rate of the vehicle has a maximum value, i.e., a peak value, in the curved-road traveling time period t1 on the basis of the yaw rate of the vehicle detected by the vehicle sensor 200. In other words, the controller 400 may acquire a steering angle in a time period of Z seconds that includes the timing at which the yaw rate of the vehicle has the maximum value. In step S18 thereafter, the controller 400 may calculate a steering angular velocity α or a steering angular acceleration β in the time period of Z seconds. In step S20 thereafter, the controller 400 may calculate a standard deviation σ of the one of the steering angular velocity α and the steering angular acceleration β calculated in step S16.

In step S22 thereafter, the controller 400 may determine whether a value of the standard deviation σ is greater than a predetermined threshold T. When the value of the standard deviation σ is determined as being greater than the predetermined threshold T (YES in step S22), the process may proceed to step S24. In a case where the process proceeds to step S24, it may be considered that steering is unstable since variation in the calculated one of the steering angular velocity α and the steering angular acceleration β is relatively great. Accordingly, the controller 400 may determine that the driver is the non-skilled driver in step S24. The controller 400 may bring the process to an end after performing the process in step S24.

In contrast, when the value of the standard deviation σ is determined as being equal to or smaller than the predetermined threshold T in step S22 (NO in step S22), the process may proceed to step S26. In a case where the process proceeds to step S26, it may be considered that the steering is stable since the variation in the calculated one of the steering angular velocity α and the steering angular acceleration β is relatively small. Accordingly, the controller 400 may determine that the driver is the skilled driver in step S26. The controller 400 may bring the process to an end after performing the process in step S26.

Figure 4A:
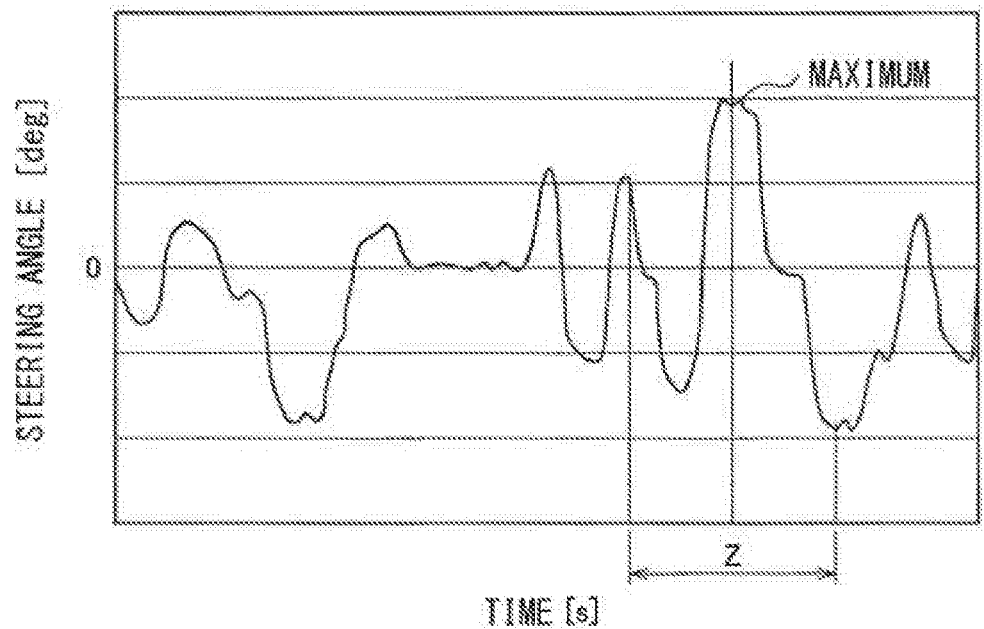
FIG. 4A is a characteristic diagram illustrating an example of variation in a steering angle in a time period of Z seconds including time periods before and after timing at which a yaw rate has a maximum value, i.e., a peak value, while a vehicle is traveling on a curved road.
Figure 4B:
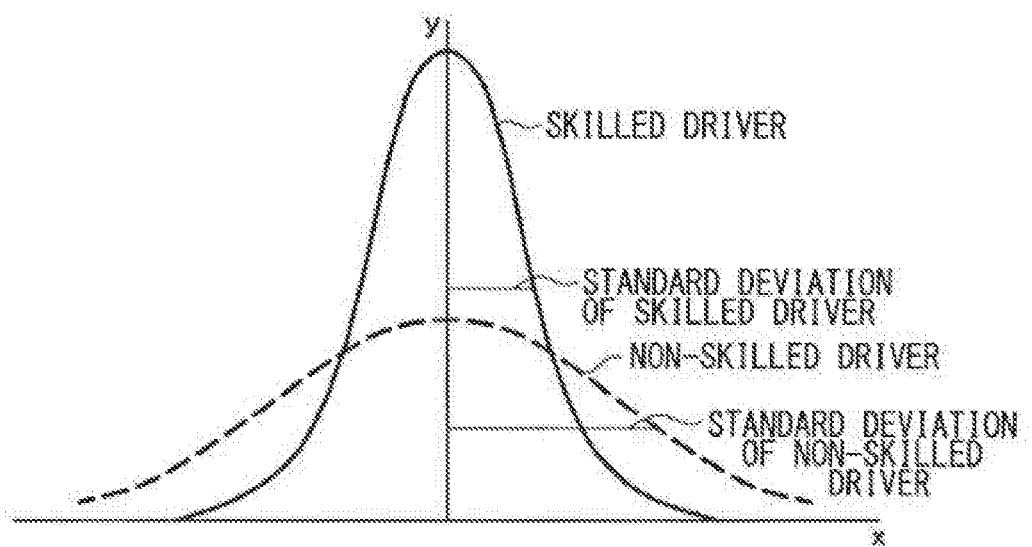
FIG. 4B is a characteristic diagram illustrating an example of standard deviations of the skilled driver and a non-skilled driver determined on the basis of a distribution of a steering angular velocity in the time period of Z seconds illustrated in FIG. 4A.

FIG. 4A is a characteristic diagram illustrating the steering angle in the time period of Z seconds including the time periods before and after the timing at which the yaw rate has the maximum value, i.e., the peak value, in step S16. FIG. 4B is a characteristic diagram illustrating standard deviations of the skilled driver and the non-skilled driver determined on the basis of a distribution of the steering angular velocity in the time period of Z seconds. As illustrated in FIG. 4B, the distribution of the steering angular velocity of the skilled driver may be narrower than that of the non-skilled driver, and a value of the standard deviation of the skilled driver may be therefore smaller than that of the non-skilled driver.

FIG. 3 illustrates a process of determining the driving skill level of the driver on the basis of a driving state at a time when the vehicle is traveling on a straight road. Wobbling of the vehicle that is traveling on the straight road may be evaluated on the basis of a standard deviation of a lateral acceleration of the vehicle to thereby determine the driving skill level in this process.

First, in step S30, the controller 400 may determine whether the vehicle is traveling on the straight road on the basis of the yaw rate of the vehicle detected by the vehicle sensor 200. In a specific but non-limiting example, the controller 400 may determine that the vehicle is traveling on the straight road in a case where the yaw rate is smaller than a predetermined threshold X in step S30. When the vehicle is determined as being traveling on the straight road (YES in step S30), the process may proceed to step S32. When the vehicle is determined as not being traveling on the straight road (NO in step S30), the controller 400 may bring the process to an end.

In step S32, the controller 400 may determine whether a straight-road traveling time period t2, i.e., a time period during which the vehicle is traveling on the straight road, reaches a certain time period. In a specific but non-limiting example, the controller 400 may measure the straight-road traveling time period t2 and determine whether the straight-road traveling time period t2 is greater than a predetermined threshold Y in step S32. When the straight-road traveling time period t2 is greater than the threshold Y (YES in step S32), the controller 400 may determine that the straight-road traveling time period t2 reaches the certain time, and the process may proceed to step S36. When the straight-road traveling time period t2 is equal to or smaller than the threshold Y (NO in step S32), the controller 400 may bring the process to an end.

In step S36, the controller 400 may acquire a lateral acceleration in a straight-road traveling section having a relatively-small yaw rate in the straight-road traveling time period t2, on the basis of the lateral acceleration of the vehicle acquired by the vehicle sensor 200. In step S38 thereafter, the controller 400 may calculate a standard deviation γ of the lateral acceleration acquired in step S36.

In step S40 thereafter, the controller 400 may determine whether a value of the standard deviation γ is greater than a predetermined threshold S. When the value of the standard deviation γ is determined as being greater than the predetermined threshold S (YES in step S40), the process may proceed to step S42. In a case where the process proceeds to step S42, it may be considered that behavior of the vehicle is unstable since variation in the lateral acceleration is relatively great. Accordingly, the controller 400 may determine that the driver is the non-skilled driver in step S42. The controller 400 may bring the process to an end after performing the process in step S42.

In contrast, when the value of the standard deviation γ is determined as being equal to or smaller than the predetermined threshold S in step S40 (NO in step S40), the process may proceed to step S44. In a case where the process proceeds to step S44, it may be considered that the behavior of the vehicle is stable since the variation in the lateral acceleration is relatively small. Accordingly, the controller 400 may determine that the driver is the skilled driver in step S44. The controller 400 may bring the process to an end after performing the process in step S44.

The controller 400 or the skill level determining unit 402 may determine, on the basis of a result of the authentication performed by the driver authentication unit 406, the driving skill level of a driver whose driving skill level has been already determined. For example, in a case where a driver A that has been determined as the non-skilled driver in the past drives the vehicle again, the authentication of the driver A by the driver authentication unit 406 may allow for determination of the driver A as the non-skilled driver without performing the process illustrated in FIG. 2 or 3. Similarly, for example, in a case where a driver B that has been determined as the skilled driver in the past drives the vehicle again, the authentication of the driver B by the driver authentication unit 406 may allow for determination of the driver B as the skilled driver without performing the process illustrated in FIG. 2 or 3.

The determination of the driving skill level may be performed by a method other than the methods illustrated in FIGS. 2 and 3. In one non-limiting example, the driving skill level may be determined by evaluating smoothness of the acceleration on the basis of a standard deviation of a variation rate of an accelerator pedal position. In another non-limiting example, the driving skill level may be determined by evaluating the wobbling of the vehicle traveling on the straight road on the basis of a traveling locus obtained by means of the GPS through the navigation device 700, lane line detection performed by the vehicle exterior sensor 100, or any other method. The evaluation of the wobbling of the vehicle traveling on the straight road may be evaluated, for example but not limited to, on the basis of a result of analysis of a frequency of the steering angular velocity, a time at which an absolute value of the steering angular velocity exceeds a predetermined value, how many times the absolute value of the steering angular velocity exceeds the predetermined value, how often the absolute value of the steering angular velocity exceeds the predetermined value, a standard deviation of the yaw rate, or comparison of a factor such as the number of times the vehicle deviated from a lane with a threshold, other than the traveling locus. The driving skill level may be also evaluated by evaluating a way of keeping an inter-vehicle distance on the basis of a standard deviation of, for example, a time left before the vehicle comes into contact with another vehicle in front of the vehicle.

Figure 5:
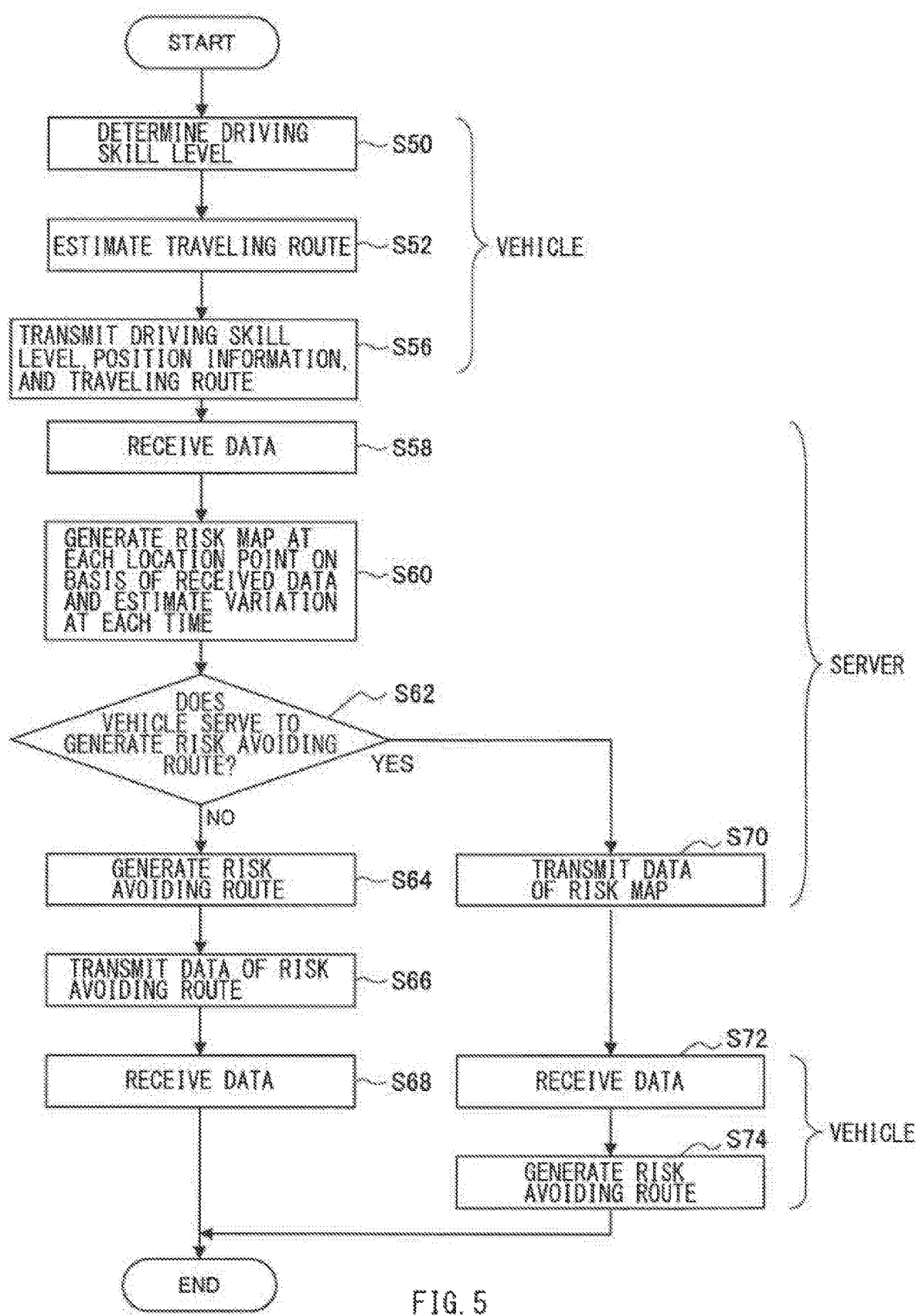
FIG. 5 is a flowchart illustrating an example of a process of generating a risk map, i.e., map information based on a driving skill level, and setting a risk avoiding route, i.e., a recommended route directed to avoidance of a risk.

In one example embodiment, the server 2000 may acquire information from a plurality of vehicles on the basis of results of the determination of the driving skill levels of the drivers of the vehicles as described above. The map information indicating presence of the vehicles in accordance with the driving skill levels may be thereby generated by the server 2000. The server 2000 may transmit the generated map information to each vehicle for which driving assistance is to be performed. The server 2000 may also search for a recommended route related to each vehicle on the basis of the generated map information, set the recommended route, and provide the set recommended route to each vehicle. FIG. 5 is a flowchart illustrating an example of a process of generating the map information in accordance with the driving skill levels and setting a recommended route directed to avoidance of a risk.

In FIG. 5, processes in steps S50 to S56, S68, S72, and S74 may be performed by the vehicle system 1000, e.g., the controller 400. Processes in step S58 to S66 and S70 may be performed by the server 2000. In one embodiment, the controller 400 may serve as a "control apparatus for a vehicle." In one embodiment, the server 2000 may serve as an "information processing apparatus."

First, in step S50, the skill level determining unit 402 may determine the driving skill level of the driver. The determination of the driving skill level may be performed by means of the process illustrated in FIG. 2 or 3. For example, a threshold process may be performed in step S50 to determine whether the driver is the skilled driver or the non-skilled driver. The threshold process may compare the value of the standard deviation σ with a threshold, for example.

In step S52 thereafter, the traveling route estimating unit 410 may estimate the traveling route. The traveling route estimating unit 410 may estimate an actual traveling route on the basis of a searched route, i.e., a route from the current position to the destination searched for by the navigation device 700. In a case where the current position of the vehicle is on the searched route, the traveling route may be the searched route.

In step S56 thereafter, the communication process unit 404 may transmit the driving skill level, the position information of the vehicle, and traveling route information to the server 2000 via the communication device 800. The traveling route information may be information related to the traveling route.

In step S58, the communication process unit 2050 of the server 2000 may perform a process of receiving the driving skill level, the position information of the vehicle, and the traveling route information transmitted from the vehicle system 1000.

In step S60 thereafter, the risk map generating unit 2020 may generate the risk map on the basis of the information, received in step S58, including the driving skill level, the position information of the vehicle, and the traveling route information. The risk map is not limited to that at a current time. The risk map generating unit 2020 may be configured to estimate variation at each time and generate the risk map taking into consideration the estimated variation.

Figure 6:
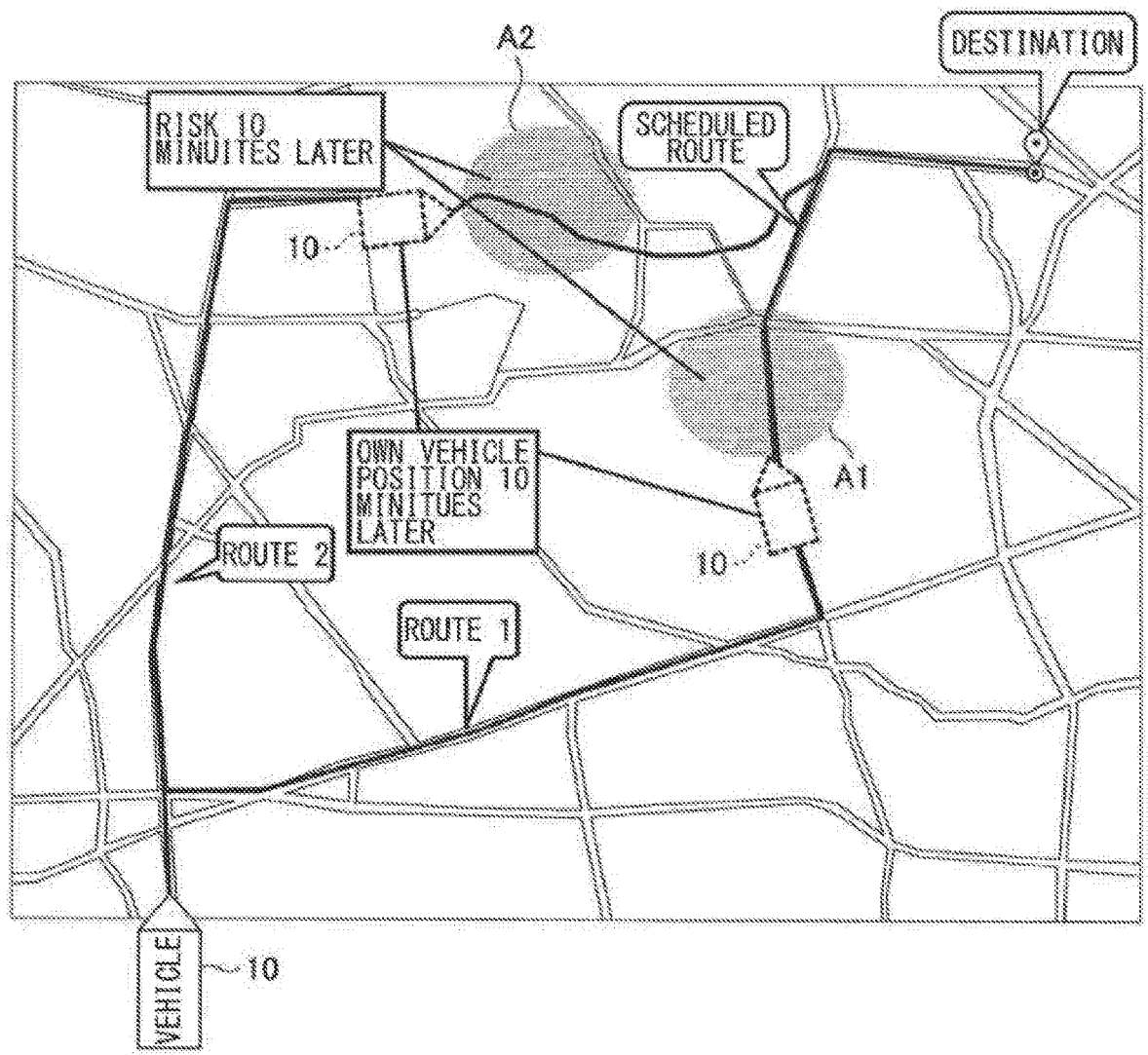
FIG. 6 is a schematic diagram illustrating an example of the risk map.

FIG. 6 is a schematic diagram illustrating an example of the risk map generated by the risk map generating unit 2020.

In one example embodiment, the risk map generating unit 2020 may generate a risk map indicating a degree of concentration of vehicles driven by the non-skilled drivers, on the basis of the driving skill levels, pieces of position information of the vehicles, and pieces of traveling route information received from the respective vehicles. For example, the evaluation point calculating unit 2060 may calculate a risk evaluation point P by the following expression (1) where A is the number of vehicles each of which is driven by the skilled driver and is present in a region within a radius of 500 m around any location point, and B is the number of vehicles each of which is driven by the non-skilled driver.

$$\text{Risk evaluation point } P=B/(A+B) \qquad (1)$$

The risk map generating unit 2020 may determine the risk evaluation point P for each of any location points to generate the risk map as that illustrated in FIG. 6. In an example illustrated in FIG. 6, a region in which the risk evaluation point P exceeds a predetermined threshold, for example, 0.3, ten minutes later is dotted. Regions A1 and A2 are the examples of the above-described region. Thresholds set for different regions A1 and A2 may be the same as each other or may be different from each other. In one example embodiment, the position of each vehicle a predetermined time later may be determined by acquiring the traveling route information from the corresponding vehicle. This allows for generation of the risk map indicating the region with the risk evaluation point P exceeding the predetermined threshold for every predetermined time period. The regions A1 and A2 include a lot of vehicles driven by the non-skilled drivers, leading to a possibility that traveling in the regions A1 and A2 involves a risk.

In FIG. 6, two routes, i.e., a route 1 and a route 2, are indicated as the traveling routes of a vehicle (own vehicle) 10. A position of the vehicle 10 ten minutes later is indicated by a dashed line. In the example illustrated in FIG. 6, the vehicle 10 is to arrive at the region A1 in a case where the vehicle 10 travels along the route 1, and the vehicle 10 is to arrive at the region A2 in a case where the vehicle 10 travels along the route 2. Accordingly, the vehicle 10 is to pass through the region with relatively-high risk evaluation point P in both of the case where the vehicle 10 travels along the route 1 and the case where the vehicle 10 travels along the route 2. By thus generating the risk map, the regions A1 and A2 in which the risk evaluation point P exceeds the predetermined threshold may be determined every predetermined time period and the position of the vehicle 10 in each traveling route may be also determined every predetermined time period. It is therefore possible to generate a route avoiding a risk.

In processes in step S62 and in steps thereafter, route recommendation based on the risk map may be performed.

First, in step S62, the risk avoiding route generating unit 2030 may determine whether the vehicle system 1000 serves to generate the risk avoiding route. In a specific but non-limiting example, the server 2000 may determine whether the controller 400 includes the risk avoiding route generating unit 412 illustrated in FIG. 1. In a specific but non-limiting example, the server 2000 may perform communication with the vehicle system 1000 and cause the vehicle system 1000 to transmit, to the server, information indicating whether the controller 400 includes the risk avoiding route generating unit 412. This allows for the determination as to whether the controller 400 includes the risk avoiding route generating unit 412.

In a case where the vehicle system 1000 does not serve to generate the risk avoiding route as a result of the determination performed in step S62, the process may proceed to step S64. In step S64, the risk avoiding route generating unit 2030 in the server 2000 may generate the risk avoiding route.

In step S66 thereafter, the communication process unit 2050 may perform a process of transmitting data of the risk avoiding route to the vehicle system 1000.

In step S68 thereafter, the communication device 800 of the vehicle system 1000 may receive the data of the risk avoiding route.

In contrast, in a case where the vehicle system 1000 serves to generate the risk avoiding route as the result of the determination performed in step S62, the process may proceed to step S70. In step S70, the communication process unit 2050 may perform a process of transmitting the data of the risk map to the vehicle system 1000.

In step S72 thereafter, the communication device 800 of the vehicle system 1000 may receive the data of the risk map.

In step S74 thereafter, the risk avoiding route generating unit 412 of the controller 400 may generate the risk avoiding route.

The data of the risk avoiding route may be displayed on the vehicle interior display device 500 on the basis of the control performed by the display controlling unit 408. This allows the driver of the vehicle receiving the data from the server 2000 to refer to the risk avoiding route displayed on the display unit of the vehicle interior display device 500, and thereby arrive at the destination while avoiding the regions A1 and A2 including a lot of vehicles driven by the non-skilled drivers.

Figure 7:
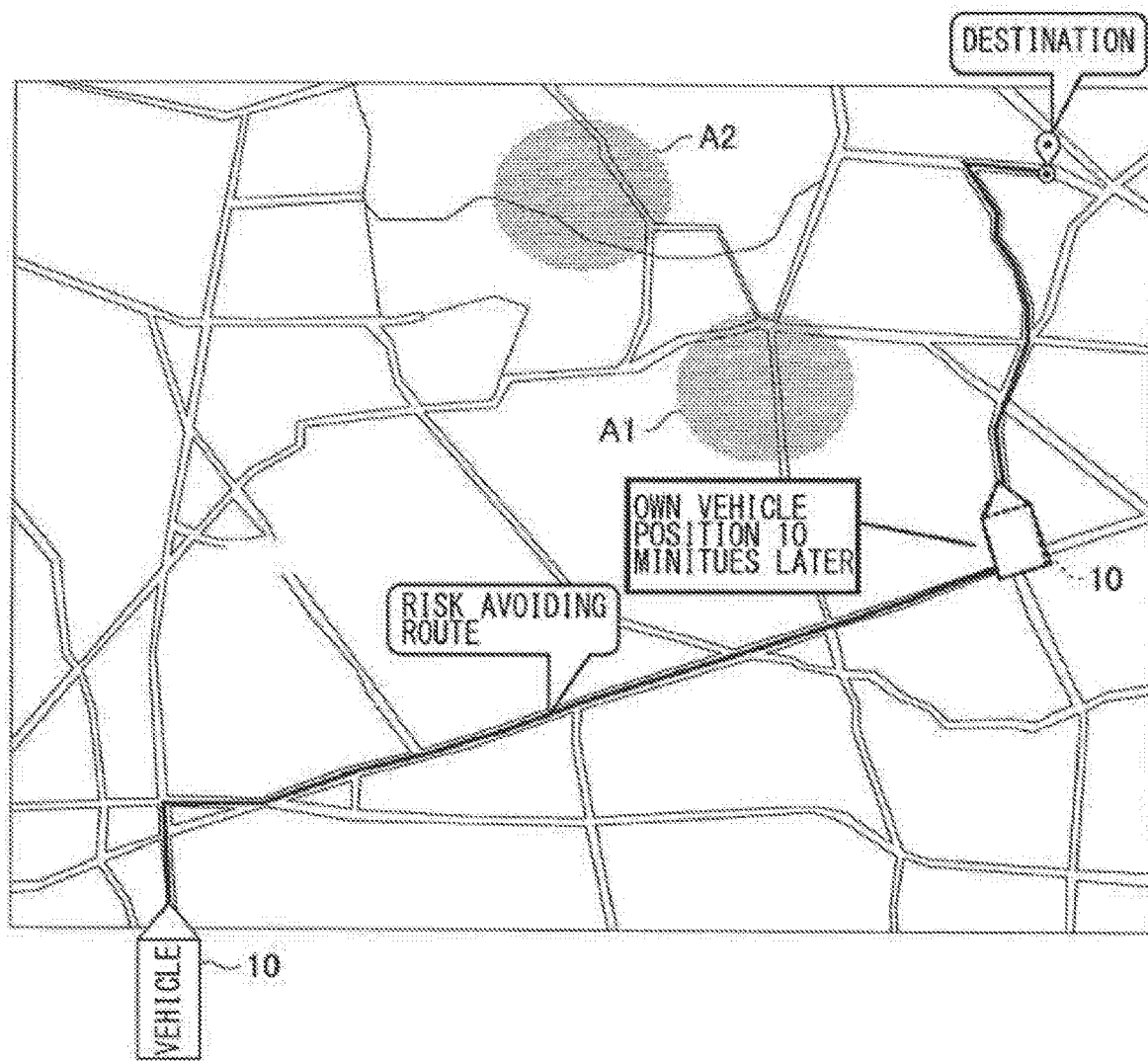
FIG. 7 is a schematic diagram illustrating an example of a risk avoiding route that avoids regions A1 and A2 illustrated in FIG. 6.

FIG. 7 illustrates a risk avoiding route that avoids the regions A1 and A2 illustrated in FIG. 6. The risk avoiding route generating unit 2030 or the risk avoiding route generating unit 412 may generate the risk avoiding route on the basis of the current position of the vehicle, the destination, and the position of the region with the risk evaluation point P exceeding the predetermined threshold, e.g., the regions A1 and A2. The risk avoiding route may be re-searched for every predetermined time period so that the risk avoiding route does not overlap the region with the risk evaluation point P exceeding the predetermined threshold. The risk avoiding route may be thereby updated every predetermined time period. Information related to the risk avoiding route such as that illustrated in FIG. 7 may be supplied to the vehicle system 1000. The supplied risk avoiding route may be displayed for the driver of the vehicle. This may prompt the driver to travel along the risk avoiding route. As a result, it is possible for the driver to arrive at the destination without passing through the region A1 or A2 having the high risk evaluation point P.

In one embodiment, the process in step S50 of the flowchart illustrated in FIG. 5 may implement an example of the "skill level determining unit" of a "control apparatus for a vehicle" by means of software. In one embodiment, the process in step S56 of the flowchart illustrated in FIG. 5 may implement an example of a "transmission process unit" of the "control apparatus for a vehicle" by means of software. In one embodiment, the process in step S72 of the flowchart illustrated in FIG. 5 may implement an example of a "reception process unit" of the "control apparatus for a vehicle" by means of software. In one embodiment, the process in step S58 of the flowchart illustrated in FIG. 5 may implement an example of a "skill level acquiring unit," a "vehicle position information acquiring unit," and a "traveling route information acquiring unit" of an "information processing apparatus" by means of software. In one embodiment, the process in step S60 of the flowchart illustrated in FIG. 5 may implement an example of an "evaluation point calculating unit" and a "map information acquiring unit" of the "information processing apparatus" by means of software. In one embodiment, the process in step S64 of the flowchart illustrated in FIG. 5 may implement an example of an "avoiding route generating unit" of the "information processing apparatus" by means of software. In one embodiment, the process in step S66 of the flowchart illustrated in FIG. 5 may implement an example of a "second transmission process unit" of the "information processing apparatus" by means of software. In one embodiment, the process in step S70 of the flowchart illustrated in FIG. 5 may implement an example of a "first transmission process unit" of the "information processing apparatus" by means of software.

Although some example embodiments of the technology have been described above in detail with reference to the accompanying drawings, the example embodiments described above do not limit the technology. It is clear that a person with a usual knowledge in a technical field of the technology is able to arrive at various alternations and modifications in the scope of the technical idea described in the appended claims. It should be clearly appreciated that such alternations and modifications are encompassed in the technical scope of the technology.

As described above, according to one embodiment of the technology, it is possible to provide an information processing apparatus for a vehicle, an information processing system for a vehicle, and a control apparatus for a vehicle that are capable of recognizing a driving skill level of a driver of a vehicle while the vehicle is traveling.

Each of the controller 400, the skill level determining unit 402, the communication process unit 404, the driver authentication unit 406, the display controlling unit 408, the traveling route estimating unit 410, the risk avoiding route generating unit 412, the skill level acquiring unit 2010, the risk map generating unit 2020, the risk avoiding route generating unit 2030, the vehicle information acquiring unit 2040, the communication process unit 2050, and the evaluation point calculating unit 2060 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the controller 400, the skill level determining unit 402, the communication process unit 404, the driver authentication unit 406, the display controlling unit 408, the traveling route estimating unit 410, the risk avoiding route generating unit 412, the skill level acquiring unit 2010, the risk map generating unit 2020, the risk avoiding route generating unit 2030, the vehicle information acquiring unit 2040, the communication process unit 2050, and the evaluation point calculating unit 2060 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the controller 400, the skill level determining unit 402, the communication process unit 404, the driver authentication unit 406, the display controlling unit 408, the traveling route estimating unit 410, the risk avoiding route generating unit 412, the skill level acquiring unit 2010, the risk map generating unit 2020, the risk avoiding route generating unit 2030, the vehicle information acquiring unit 2040, the communication process unit 2050, and the evaluation point calculating unit 2060 illustrated in FIG. 1.

The invention claimed is:

1. An information processing apparatus for a vehicle, the information processing apparatus comprising:
   a skill level acquiring unit configured to acquire driving skill levels of respective drivers of a plurality of vehicles;
   a vehicle position information acquiring unit configured to acquire pieces of position information of the vehicles; and
   a map information acquiring unit configured to acquire map information on a basis of the driving skill levels acquired by the skill level acquiring unit and the pieces of position information acquired by the vehicle position information acquiring unit, the map information indicating presence of the vehicles on a road map in accordance with the respective driving skill levels of the drivers of the vehicles, wherein the map information comprises a route to avoid drivers of the plurality of vehicles having a low driving skill.

2. The information processing apparatus for a vehicle according to claim 1, further comprising
   a traveling route information acquiring unit configured to acquire pieces of traveling route information of the vehicles, wherein
   the map information generating unit is configured to generate the map information on a basis of the pieces of traveling route information in addition to the driving skill levels and the pieces of position information.

3. The information processing apparatus for a vehicle according to claim 2, wherein the map information generating unit is configured to generate the map information indicating the presence of the vehicles at a time a predetermined time later.

4. The information processing apparatus for a vehicle according to claim 1, wherein the map information generating unit is configured to generate the map information indicating presence of a low skill level vehicle of the vehicles, the low skill level vehicle being a vehicle the driving skill level of the driver of which is low.

5. The information processing apparatus for a vehicle according to claim 4, wherein the map information generating unit is configured to generate the map information indicating a ratio of the low skill level vehicle to all vehicles present in a predetermined range of the road map.

6. The information processing apparatus for a vehicle according to claim 5, further comprising
   an evaluation point calculating unit configured to calculate an evaluation point, the evaluation point representing the ratio, wherein
   the map information generating unit is configured to generate the map information specifying a region in which the evaluation point is high.

7. The information processing apparatus for a vehicle according to claim 1, further comprising a first transmission process unit configured to perform a process of transmitting the map information to another vehicle different from the vehicles.

8. The information processing apparatus for a vehicle according to claim 7, further comprising an avoiding route generating unit configured to generate an avoiding route, the avoiding route avoiding the region in which the evaluation point is high to arrive at a destination of a traveling route of the other vehicle different from the vehicles.

9. The information processing apparatus for a vehicle according to claim 8, further comprising a second transmission process unit configured to perform a process of transmitting the avoiding route generated by the avoiding route generating unit to another vehicle different from the vehicles.

10. The information processing apparatus for a vehicle according to claim 9, wherein the second transmission process unit is configured to transmit a signal to the other vehicle different from the vehicles, the signal prompting display of the avoiding route with respect to a driver or a passenger of the other vehicle.

11. An information processing system for a vehicle, the information processing system comprising:
    a control apparatus including
      a skill level determining unit configured to determine a driving skill level of a driver of a vehicle, and
      a transmission process unit configured to perform a process of transmitting the driving skill level and position information of the vehicle; and
    an information processing apparatus including
      a skill level acquiring unit configured to acquire the driving skill levels of the drivers of a plurality of the vehicles,
      a vehicle position information acquiring unit configured to acquire pieces of the position information of the vehicles, and
      a map information generating unit configured to generate map information in accordance with the driving skill levels acquired by the skill level acquiring unit and the pieces of position information acquired by the vehicle position information acquiring unit, the map information indicating presence of the vehicles on a road map on a basis of the respective driving skill levels of the drivers of the vehicles, wherein the map information comprises a route to avoid drivers of the plurality of vehicles having a low driving skill.

12. A control apparatus for a vehicle, the control apparatus comprising:
    a skill level acquiring unit configured to acquire a driving skill level of a driver of a vehicle;
    a transmission process unit configured to perform a process of transmitting the driving skill level acquired by the skill level acquiring unit and position information of the vehicle; and
    a reception process unit configured to receive map information, the map information being generated on a basis of the driving skill levels of a plurality of vehicles and pieces of the position information of the vehicles, the map information indicating presence of the vehicles on a road map in accordance with the respective driving skill levels of the drivers of the vehicles wherein the map information comprises a route to avoid drivers of the plurality of vehicles having a low driving skill.

13. An information processing apparatus for a vehicle, the information processing apparatus comprising circuitry configured to
- acquire driving skill levels of respective drivers of a plurality of vehicles,
- acquire pieces of position information of the vehicles, and
- generate map information on a basis of the acquired driving skill levels and the acquired pieces of position information, the map information indicating presence of the vehicles on a road map in accordance with the respective driving skill levels of the drivers of the vehicles wherein the map information comprises a route to avoid drivers of the plurality of vehicles having a low driving skill.

14. The information processing apparatus for the vehicle according to claim 1, further comprising
- an evaluation point calculating unit configured to calculate a first evaluation point of a first region based on first driving skill levels of first drivers of first target vehicles to be present in the first region among the driving skill levels, and calculate a second evaluation point of a second region based on second driving skill levels of second drivers of second target vehicles to be present in the second region among the driving skill levels,
- wherein the map information generating unit is configured to generate the map information based on the first evaluation point, the second evaluation point, and the road map indicating a region including the first region and the second region.

15. The information processing apparatus for the vehicle according to claim 14, wherein the map information generating unit is further configured to compare the first evaluation point with a threshold, and determine the route based on the comparing of the first evaluation point with the threshold.

16. The information processing apparatus for the vehicle according to claim 11,
- wherein the information processing apparatus further includes an evaluation point calculating unit configured to calculate a first evaluation point of a first region based on first driving skill levels of first drivers of first target vehicles to be present in the first region among the driving skill levels, and calculate a second evaluation point of a second region based on second driving skill levels of second drivers of second target vehicles to be present in the second region among the driving skill levels, and
- wherein the map information generating unit is configured to generate the map information based on the first evaluation point, the second evaluation point, and the road map indicating a region including the first region and the second region.

17. The information processing apparatus for the vehicle according to claim 16, wherein the map information generating unit is further configured to compare the first evaluation point with a threshold, and determine the route based on the comparing of the first evaluation point with the threshold.

18. The information processing apparatus for the vehicle according to claim 13, wherein the circuitry is further configured to
- calculate a first evaluation point of a first region based on first driving skill levels of first drivers of first target vehicles to be present in the first region among the driving skill levels, and
- calculate a second evaluation point of a second region based on second driving skill levels of second drivers of second target vehicles to be present in the second region among the driving skill levels,
- wherein the circuitry is configured to generate the map information based on the first evaluation point, the second evaluation point, and the road map indicating a region including the first region and the second region.

19. The information processing apparatus for the vehicle according to claim 16, wherein the circuitry is further configured to compare the first evaluation point with a threshold, and determine the route based on the comparing of the first evaluation point with the threshold.

* * * * *